United States Patent [19]

Settlemeyer et al.

[11] Patent Number: 4,739,831

[45] Date of Patent: Apr. 26, 1988

[54] GAS FLOODING PROCESS FOR THE RECOVERY OF OIL FROM SUBTERRANEAN FORMATIONS

[75] Inventors: Lois A. Settlemeyer; Monty J. McCoy, both of Midland, Mich.

[73] Assignee: The Dow Chemical Company, Midland, Mich.

[21] Appl. No.: 910,110

[22] Filed: Sep. 19, 1986

[51] Int. Cl.$^4$ .............................................. E21B 43/22
[52] U.S. Cl. ................................... 166/273; 166/274; 252/8.554
[58] Field of Search ....................... 166/273, 274, 275; 252/8.554

[56] References Cited

U.S. PATENT DOCUMENTS

| | | | |
|---|---|---|---|
| 3,491,832 | 1/1970 | Raza | 166/309 X |
| 3,893,511 | 7/1975 | Root | 166/309 X |
| 3,981,361 | 9/1976 | Healy | 166/275 X |
| 4,288,334 | 9/1981 | McCoy et al. | 166/275 X |
| 4,495,995 | 1/1985 | Chen et al. | 166/309 X |
| 4,532,051 | 7/1985 | Nuckels neé Byth et al. | 166/275 X |
| 4,610,304 | 9/1986 | Doscher | 166/268 X |

Primary Examiner—George A. Suchfield

[57] ABSTRACT

In a gas flooding operation, the sweep efficiency of the gas is improved using a surfactant solution comprising an alkylated diphenyl sulfonate.

16 Claims, No Drawings

GAS FLOODING PROCESS FOR THE RECOVERY OF OIL FROM SUBTERRANEAN FORMATIONS

BACKGROUND OF THE INVENTION

This invention relates generally to a process for the recovery of oil from subterranean formations, and more particularly to a gas flooding process.

Petroleum or oil is generally recovered from subterranean formations by penetrating the formation with one or more wells and pumping or permitting the petroleum to flow to the surface through the well. In various recovery operations, an external driving force is not required to drive the petroleum to the producing well and/or the surface. For example, some natural driving energy such as an underlying active water drive or a gas under some minimum pressure may possess sufficient pressure to drive the petroleum or hydrocarbon to the well and then to the surface. Recovery of petroleum using natural energy is referred to as primary recovery.

In many instances, the natural driving energy is insufficient or becomes insufficient to cause the petroleum to flow to the well. For example, a substantial portion of the petroleum to be recovered may remain in the formation after depletion of the natural driving energy. In other cases, the subterranean formation, while containing substantial amounts of petroleum, may not possess the necessary driving force to recover any of the petroleum. In such cases, various techniques have been applied heretofore to recover the petroleum. Although such techniques are commonly referred to as secondary recovery, in fact, they may be primary, secondary or tertiary in sequence of employment.

One conventional method for the secondary recovery of petroleum from a subterranean formation involves injecting water through one or more injection wells to drive the residual petroleum or oil towards a producing well. However, water alone does not efficiently displace petroleum. Therefore, it has become a common practice to add a variety of materials to the drive water to improve the efficiency of the flooding operation. Specifically, it is a common practice to add a surfactant such as a petroleum sulfonate to the drive water. The surfactant reduces the interfacial tensions between the water and the oil, thereby making the oil more miscible with the water and increasing oil recovery. In general, the lower the interfacial tension between the oil and water, the better the performance of the water flooding operation.

In various operations, the water or water/surfactant mixture channels through the formation such that a disproportionately high amount of the water passes through zones of high permeability into the producing wellbore without contacting appreciable amounts of oil in the reservoir, particularly that oil contained in zones of low permeability. This greatly reduces the efficiency of the operation. There are a number of methods to control the flow of drive water through the subterranean formation.

An alternative method of secondary oil recovery involves using steam, particularly in secondary oil recovery methods for heavy oils. The steam reduces the viscosity and, hence, increases the flowability of the oil. One such method is cyclic steam stimulation (so-called "huff-n-puff" method for the secondary recovery of oil) wherein, in one portion of the cycle, steam is injected into a producing well and, in a second portion of the cycle, oil is recovered from the producing well. A second method is a steam flooding operation wherein steam is injected into an injection well to drive the oil to the producing well. To improve the efficiency of these recovery methods, steam injection is often alternated with injections of a surfactant solution which is capable of foaming. The resulting foam controls the mobility of the following steam as it passes through the formation by rendering it more difficult for the steam to flow through the paths previously swept by the steam. In general, the ability of the surfactant to reduce the interfacial tension between the steam and the oil is not as important as the ability of the surfactant solution to form a stable foam and may be of only minor, if any, importance. Therefore, surfactants which are useful in water flooding are not necessarily useful, and are often not useful, in the secondary oil recovery methods using steam. The surfactant employed in secondary oil recovery methods involving steam is exposed to high temperatures (e.g., 175° C. to 232° C.) and water of relatively high purity (i.e., water having a low dissolved solids content) and are chosen accordingly.

Yet another method of secondary oil recovery is gas flooding which involves injecting a gas such as carbon dioxide or nitrogen into the formation through one or more injection wells to drive the oil in the reservoir towards a producing well. In a gas flooding operation, the gas can be injected as a solution or dispersion with water. Alternatively, the gas can be injected without water and, in such case, will often form either a solution or dispersion with water which naturally exists in the formation or which has been injected either previous or subsequent to the gas injection. Although gas or a gas/water mixture can be employed alone, in general, gas flooding comprises alternatively injecting gas and drive water. In theory, the gas or gas/water mixture thins or solubilizes the oil and the drive water pushes the gas or gas/water mixture and oil to a producing well.

Unfortunately, the gas or gas/water mixture is prone to channel through the formation such that a disproportionately high amount of the gas bypasses through zones of high permeability into the producing wellbore without contacting appreciable amounts of oil in the reservoir. To prevent channeling of the gas and drive water and to otherwise control the mobility of the drive fluids, thereby increasing oil production, it has been suggested to employ a foam prepared from a mixture of water and a surfactant during the gas flooding operation. Such mixture has been found to prevent channeling and to force the drive fluids into the less permeable zones, thereby increasing oil production.

Surfactants which have been found to be useful as a means of modifying the profile in a gas flooding operation are surfactants capable of forming a foam with an aqueous liquid and include alkyl polyethylene oxide sulfates (see, for example U.S. Pat. No.4,113,011); polyalkoxy sulfonates (see, for example U.S. Pat. No. 4,502,538); polyalkoxylated alcoholic or phenolic surfactants (see, for example U.S. Pat. No. 4,380,266) and the like. The surfactant employed in a gas flooding operation is exposed to relatively low temperatures (e.g., less than 95° C.) and water of relatively low purity (i.e., water having a relatively high dissolved solids content). Therefore, surfactants which may be useful in water and/or steam flooding may not necessarily be useful, and are often not useful, in the secondary oil recovery methods using gas flooding techniques.

However, the surfactants heretofore taught to be effective in modifying the mobility of the drive fluids in gas flooding operations have not proved to be particularly effective in every operation. Specifically, in certain instances, greater foam stabilities are desired to achieve the desired increase in oil production. In other instances, the surfactants have not been found to be particularly effective regardless of their foaming ability as measured in the laboratory.

In view of the deficiencies of the prior art methods for improving the mobility of the drive fluids in a gas flooding operation, it remains highly desirable to provide an improved method for controlling the mobility of the drive fluids in a gas flooding operation.

SUMMARY OF THE INVENTION

Accordingly, the present invention is an improved method for recovering hydrocarbon from a subterranean formation. The recovery method comprises sequentially injecting, through an injection well, a drive fluid or a gas of a gas/liquid mixture to drive the hydrocarbon from the formation to a producing well and a mobility control fluid of a surfactant/water mixture into the subterranean formation, the improvement in said method comprising using an alkylated diphenyl sulfonate surfactant in the mobility control fluid.

As used herein, the term "mobility control" is employed in its broadest sense and is meant to include the term "profile modification". The term "mobility control" is meant to include any process whereby the sweep efficiency of a reservoir is improved or whereby the injection profile of an injection well is altered. The term "sequentially injecting" is meant to include those operations in which the drive fluid and the mobility control fluid are injected as separate sequential "slugs" as well as operations in which the drive fluid is injected continuously and the mobility control fluid is injected simultaneous with the drive fluid, but on a periodic basis.

The alkylated diphenyl sulfonate, preferably an alkylated diphenyl oxide sulfonate, surfactant has been found to be useful, either alone or in combination with anionic polyoxyalkylated surfactants, as a mobility control agent in a gas flood operation for the recovery of hydrocarbon from subterranean formations. Specifically, in various applications, particularly in the recovery of hydrocarbons from reservoirs of low or extremely low permeability (e.g., a reservoir having a permeability of from 0.1 to about 50 millidarcies) and/or those environments of high temperature, e.g., above about 120° C., or having high concentration of divalent metal anions, e.g., calcium ions. the alkylated diphenyl sulfonate surfactant acts as an excellent mobility control agent, thereby improving the sweep efficiency of the gas drive and the overall hydrocarbon production, without the need for supplemental surfactants.

In another aspect, the alkylated diphenyl sulfonate surfactant is advantageously employed in combination with an anionic polyoxyalkylated surfactant and in a preferred embodiment, the present invention is an improved gas flooding operation wherein the improvement comprises using a mobility control fluid containing a surfactant mixture of at least two surfactants with one surfactant being an alkylated diphenyl sulfonate and the second surfactant being an anionic polyoxyalkylated surfactant.

Using an alkylated diphenyl sulfonate in combination with an anionic polyoxyalkylated surfactant, e.g., polyoxyethylated alcohol sulfate, unexpectedly improves the foamability as well as the foam stability of the foaming surfactant, thereby enhancing the performance of the mobility control fluid in improving the sweep efficiency of the drive fluid in a gas flooding operation. The improved foamability and foam stability is evident both when the mobility control fluid is foamed in the absence or presence of oil. This improvement in foam stability and foamability is particularly surprising in view of the fact that the alkylated diphenyl sulfonate is not particularly effective as a foaming surfactant. In many cases, the improved surfactant mixture exhibits fifty percent or more improvement in foamability and/or stability.

DETAILED DESCRIPTION OF THE INVENTION

The mobility control fluid employed in the practice of the present invention comprises an alkylated diphenyl sulfonate. As the term is used herein, alkylated diphenyl sulfonates are preferably represented by the general structural formula:

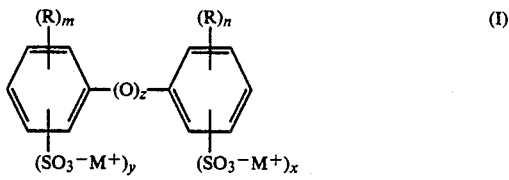

wherein z is 0 or 1, preferably 1; each R is independently an alkyl or substituted alkyl radical; each m and n is independently 0, 1 or 2, provided at least one of m or n is 1; each M is independently hydrogen, an alkali metal, alkaline earth metal, or ammonium or substituted ammonium and each x and y are individually 0 or 1 with the proviso that at least one of x or y is 1. Preferably, the R group(s) are independently an alkyl group having from 4 to 24, more preferably from 6 to 16 carbon atoms. The alkyl groups can be linear, branched or cyclic but linear or branched radicals are preferred. The $M^+$ ammonium ion radicals are of the formula $(R')_3HN^+$ wherein each $R'$ is independently hydrogen, a $C_1$–$C_4$ alkyl or a $C_1$–$C_4$ hydroxyalkyl radical. Illustrative $C_1$–$C_4$ alkyl and hydroxyalkyl radicals include methyl, ethyl, propyl, isopropyl, butyl, hydroxymethyl and hydroxyethyl. Typical ammonium ion radicals include ammonium ($N^+H_4$), methylammonium ($CH_3N^+H_3$), ethylammonium ($C_2H_5N^+H_3$), dimethylammonium (($CH_3)_2N^+H_2$), methylethylammonium ($CH_3N^+H_2C_2H_5$), trimethylammonium (($CH_3)_3N^+H$), dimethylbutylammonium (($CH_3)_2N^+HC_4H_9$), hydroxyethylammonium ($HOCH_2CH_2N^+H_3$) and methylhydroxyethylammonium ($CH_3N^+H_2CH_2CH_2OH$). Preferably, each M is independently ammonium or substituted ammonium or alkali metal.

The alkylated diphenyl sulfonates and their methods of preparation are well known and reference is made thereto for the purposes of this invention. Representative surfactants and their methods of preparation are disclosed in U.S. Pat. Nos. 3,264,242; 3,634,272; and 3,945,437 (all of which are hereby incorporated by reference).

In the practice of the present invention, the alkylated diphenyl sulfonate is typically a mixture of compounds having the formula (I) wherein sufficient x and y are 1 such that the sum of x plus y for the alkylated diphenyl sulfonate is at least about 1.7, more preferably at least about 1.8. In addition, mixtures of a mono- or dialkylated diphenyl sulfonates or a mixture of mono- and di-alkylated diphenyl sulfonates can be employed.

Most preferably, an alkylated diphenyl oxide sulfonate or mixture of two or more alkylated diphenyl oxide sulfonates are employed in the practice of the present invention.

The preferred alkylated diphenyl oxide sulfonates include sodium disulfonated hexyl-diphenyl oxide, sodium disulfonated decyldiphenyl oxide, sodium disulfonated dodecyl-diphenyl oxide and sodium disulfonated hexadecyl-diphenyl oxide.

Although the alkylated diphenyl sulfonate can be employed in the mobility control fluid without additional surfactant, in general, for most preferred performance, the alkylated diphenyl sulfonate is employed in combination with an anionic polyoxyalkylated surfactant. In general, anionic polyoxyalkylated surfactant can be represented by the general structure formula:

$$R''O[(CH_2)_dO]_eA$$

wherein $R''$ is a hydrocarbon or halogen substituted hydrocarbon radical containing from about 4 to about 24, advantageously from about 6 to about 18, carbon atoms; d is from about 2 to about 6, preferably 2 or 3; e is at least 1, preferably from about 2 to about 20 and A is an anionic groups such as a sulfate, sulfonate, phosphate or phosphonate. $R''$ can be an branched or straight chain aliphatic or halogen substituted aliphatic group, an alicyclic or halogen substituted alicyclic group, an alkaryl or halogen substituted alkaryl group, or an aryl or halogen substituted aryl group.

Preferably, $R''$ is an alkyl group having from 6 to 18, more preferably from 6 to 14, carbon atoms. Preferably, $-A$ is a sulfate group as represented by the formula:

$$-SO_4^-M^+$$

wherein M is an alkali metal or $NH_4$, preferably sodium or $NH_4$. Most preferably, $R''$ is a $C_{6-14}$ alkyl, d is 2, e is from about 2 to about 12 and $-A$ is $-SO_4^-Na^+$.

Representative examples of preferred anionic polyoxyalkylated surfactants include $C_{12-13}O(C_2H_4O)_3SO_4NH_4$ sold under the tradename Neodol ®23-3A and $C_{12-13}O(C_2H_4O)_3SO_4Na$ sold under the tradenamde of Neodol ®25-3S by Shell Chemical Company, $C_{8-10}O(C_2H_4O)_{2-4}SO_4NH_4$ sold under the tradename of Alipal ®CD-128 by GAF, $CH_3-(CH_2)_n-CH[-(CH_2)_{n'}-CH_3][-O-(C_2H_4O)_3SO_4X]$ wherein X is $NH_4$ or Na sold under the tradename Tergitol ®S by Union Carbide.

In preparing the mobility control fluid, the alkylated diphenyl sulfonate surfactant or mixture of alkylated diphenyl sulfonate and anionic polyoxyalkylated surfactants are dissolved or dispersed in an aqueous fluid. The aqueous fluid can be water (including alkaline or acidic aqueous solutions) or mixtures of water and one or more water miscible liquid such as a lower alkanol, e.g., ethanol or propanol; a lower ketone, e.g., acetone or methyl ethyl ketone; a glycol such as ethylene glycol; and the like. It will often be more convenient to use the brine native to the subterranean formation toprepare the mobility control fluid.

The amounts of surfactant(s) most advantageously employed in preparing the mobility control fluid are dependent on a variety of factors including the specific surfactant(s) and aqueous liquid employed and the specific end-use application. In general, the mobility control fluid will advantageously comprise from about 0.001 to about 5, preferably from about 0.1 to about 1, weight percent of surfactant. When a combination of alkylated diphenyl sulfonate surfactant and anionic polyoxyalkylated surfactant are employed, the mobility control fluid is preferably comprised of from about 20 to about 100, more preferably from about 25 to about 75, most preferably from about 40 to about 60, weight percent of the alkylated diphenyl sulfonate surfactant and from about 80 to about 0, more preferably from about 25 to about 75, most preferably from about 60 to about 40, weight percent of the anionic polyoxyalkylated surfactant, based on the total weight of the surfactants.

The drive or displacement fluid employed in the gas flooding operation of the present invention is a gas or a gas/liquid, generally a gas or a gas/aqueous liquid mixture. The gases which can be employed as the drive fluid are suitably any gas at least a portion of which will not all be present as a liquid at the temperature and pressure of the formation. Air, nitrogen, carbon dioxide, normally gaseous paraffinic hydrocarbons such as methane, ethane, propane or butane as well as normally gaseous olefinic hydrocarbons such as ethylene, propylene or butylene and mixtures thereof are most often advantageously employed. Crude gases such as exhaust gas or flue gas, which are predominantly carbon dioxide and nitrogen, as well as natural gas or liquefied petroleum gas (LPG) may also be used. Mixtures of any two or more of these gases may be used although care must be exercised if a mixture of air or other oxygen containing gas and a combustible gas are to be used. Of the foregoing, gases which are somewhat soluble in petroleum are generally preferably employed in the practice of the present invention. Carbon dioxide and the paraffinic hydrocarbons such as methane or ethane, or the olefinic gases are most preferably employed.

Although the gas flooding operation can be initiated at essentially any time during the recovery operation, in general, the gas flooding operation is initiated following the economic recovery of the hydrocarbon from the reservoir using primary and secondary (e.g., water flooding) recovery techniques on the formation.

In the practice of the present invention, the drive fluid comprising the gas or gas/liquid mixture and the mobility control fluid are sequentially injected into the subterranean formation using techniques known in the art. The drive fluid comprising the gas or gas/liquid mixture is injected, for a period of time, into the formation through one or more injection well(s) to drive the hydrocarbon contained by the formation to the producing well. For example, a five-spot pattern wherein four injection wells are located in a square pattern and a single producing well located at or near the center of the square defined by the injection wells is often advantageously employed. A variety of other patterns are also advantageously employed.

In general, the temperature and pressure at which the gas flooding operation is conducted and the drive and mobility control fluids are exposed varies from about 30° C. to about 120° C. and from about 300 to about 6000 psig. The drive fluid is employed in conventional amounts normally employed in gas flooding operations. In general, injection of the drive fluid is continued until the recovery of the hydrocarbon becomes unacceptable (i.e., the sweep efficiency of the flooding operation decreases to an unacceptable level) or until undesirable amounts of the drive fluid break through into the producing wellbore, which, to a large extent, depends on the specific subterranean formation being treated, and the desired levels of hydrocarbon production. At such time, the injection of the drive fluid into the formation is interrupted and the mobility control fluid is injected into the formation through the same or different injection well. Injection of the mobility control fluid is continued for the desired amount of time. Optionally, after the injection of the surfactant solution or mobility control fluid, water is injected into the formation through the injection wells to drive the surfactant solution into the formation to promote is effectiveness as a mobility control agent. Subsequent to the injection of the mobility control fluid and water, if employed, injection of the same or different drive fluid is again initiated for a period of time, after which, if further treatment is desired, the injection of the mobility control fluid is again initiated.

The specific conditions at which the mobility control fluid (e.g., the amounts of the mobility control fluid employed and the frequency of treatment with the mobility control fluid) most advantageously employed are dependent on a variety of factors including the specific drive and mobility control, particularly the specific surfactants, employed in the flooding operation and the specific formation being treated. In general, the mobility control fluid will be employed in an amount of from about 0.05 to about 15 volume percent based on the total volume of the reservoir being treated. More preferably, the mobility control fluid is employed in an amount from about 0.1 to about 10 volume percent based on the total volume of the reservoir being treated.

The method of the present invention can be employed in formations having relatively low salt concentration or high concentrations of salt, e.g., above three percent salt. Good results can be obtained even when the salt concentration of the formation is above ten percent. In addition, the method of the present invention can be employed to formations having varying pH from about 2 to about 9 or higher and is relatively insensitive to formation constituents such as clay, silica and the like, i.e., adsorption losses to the formation are relatively low.

The following examples illustrate the present invention but are not to be construed to limit its scope. All parts and percentages are by weight unless otherwise indicated.

EXAMPLE 1

To simulate the hard water commonly found in subterranean formations of interest, a salt solution comprising 0.5 percent calcium chloride and 0.5 percent sodium chloride in deionized water is prepared. To the resulting hard water is added equal parts of sodium disulfonated hexyl-diphenyl oxide and an ammonium salt of polyoxyethylated alcohol sulfate sold under the tradename of Alipal CD-128 by GAF in amounts to prepare a 1 percent solution of the surfactant. One hundred milliliters (ml) of the surfactant solution is gently poured into a one quart Waring®Blendor Jar. Twenty-five ml of iso-octane are then gently poured into the blender. The solution is then sheared for 25 seconds with the blade being maintained at the highest setting. After shearing, the foamed samples are immediately poured into a 1000 ml graduated cylinder. Foam adhering to the sides of the blender jar is scrapped off with a spatula and also poured into the graduated cylinder. One hundred seconds after the beginning of the shearing operation, the foam volume is recorded and this reading is taken as the initial foam height. The liquid volume half-life is also recorded. For the purposes of the Examples, the liquid volume half-life is that time it takes for 50 ml of the aqueous surfactant solution to drain out of the foam structure. The initial foam height and the liquid volume half-life are set forth in the accompanying Table I.

EXAMPLE 2

Testing is conducted in an identical manner to Example 1 except that the surfactant solution is prepared using equal parts of an amine salt of the disulfonated hexyl-diphenyl oxide and the ammonium salt of the polyoxyethylated alcohol sulfate. The initial foam height and the liquid volume half-life is again measured and set forth in the accompanying Table I.

EXAMPLE 3

Testing is conducted in an identical manner to Example 1 except that the one percent surfactant solution is prepared using the sodium salt of the disulfonated hexyl-diphenyl oxide only. The initial foam height and the liquid volume half-life is measured and set forth in the accompanying Table I.

COMPARATIVE EXAMPLE A

Testing is conducted in an identical manner to Example 1 except that the one percent surfactant solution is prepared using the ammonium salt of the polyoxyethylated alcohol sulfate only. The initial foam height and the liquid volume half-life is measured and set forth in the accompanying Table I.

COMPARATIVE EXAMPLE B

Testing is conducted in an identical manner to Example 1 except that the one percent surfactant solution is prepared using equal parts of an amine salt of the disulfonated hexyl-diphenyl oxide and an α-olefin sulfonate sold under the tradename Witconate®AOS-10 by Witco Chemical Co. The initial foam height and the liquid volume half-life is measured and set forth in the accompanying Table I.

COMPARATIVE EXAMPLE C

Testing is conducted in an identical manner to Example 1 except that the one percent surfactant solution is prepared using the α-olefin sulfonate only. The initial foam height and the liquid volume half-life is measured and set forth in the accompanying Table I.

TABLE I

| Example No. | Surfactant[1] | Initial Foam Volume,ml | Liquid Volume Half-Life,min.[2] |
|---|---|---|---|
| 1 | $C_6DPO(Na)/CD128$ | 680 | 2 layers |
| 2 | $C_6DPO(N)/CD128$ | 610 | 2 layers |
| 3 | $C_6DPO(Na)$ | 140 | 1.75 |
| A | CD128 | 600 | 2 layers |
| B | $C_6DPO(N)/AOS10$ | 240 | 6.58 |
| C | AOS10 | 370 | 10.9 |

[1]The surfactant type is set forth in abbreviated form with: $C_6DPO(Na)$ being the sodium salt of disulfonated hexyl-diphenyl oxide; $C_6DPO(N)$ being the diethylamine salt of the disulfonated hexyl-diphenyl oxide; CD128 being the ammonium salt of the polyoxyethylated alcohol sulfate; and AOS10 being an α-olefin sulfonate.
[2]When recording the liquid volume half-life, a reading of 2 layers indicates that the sample separates as an oil/water emulsion with a 50 ml half-life of greater than 5 minutes which indicates that the foam is more stable than the individual component.

As evidenced by the data set forth in Table I, the blend of the alkylated diphenyl sulfonates with an anionic polyoxyalkylated surfactant imparted increased foam heights and equivalent liquid volume half-lifes as compared to the use of the anionic polyoxyalkylated surfactant alone. The increased foam heights are surprising in view of the low initial foam heights achieved with the alkylated diphenyl sulfonate alone and the fact that the foam height of an α-olefin sulfonate surfactant is reduced when mixed with the alkylated diphenyl sulfonate. Therefore, the combination of the alkylated diphenyl sulfonate and an anionic polyoxyalkylated surfactant, can be effectively employed in treating formations which require good foaming of the mobility control fluid. Although neither the initial foam height nor the liquid volume half-life using the alkylated diphenyl sulfonate alone is particularly good, due to the relatively low adsorption resistance and brine tolerance of the surfactant, it can be employed as an effective mobility control agent in formations which do not require significant foaming for mobility control.

EXAMPLE 4

To evaluate the effect of the presence of $CO_2$ and oil on the mobility control fluids useful in the practice of the present invention, to a 100 ml cell capable of withstanding up to at least 2700 psig and equipped with an inlet and outlet for $CO_2$, the outlet being connected to a back pressure regulator, is added 25 ml of a 1 percent solution of equal parts of the sodium salt of dodecyl diphenyl ether disulfonate sold as Pusher®XUS 40190.00 by The Dow Chemical Company and the ammonium salt of polyoxyethylated alcohol sulfate in a brine of calcium chloride having 3 percent total dissolved solids. The pressure cell is transparent so that foaming in the cell can be measured. The surfactant solution is heated to 85° C. and maintained at that temperature throughout testing. Carbon dioxide is passed through the cell at a pressure of 300 psig and the back regulator maintained at 200 psig. This is sufficient pressure to agitate the contents of the cell. The equilibrium foam height is recorded. The flow of $CO_2$ is ceased and the cell held in equilibrium at 100 psig. The time for the column to drain from its equilibrium foam height to one half its equilibrium foam height is recorded. This value is referred to as the equilibrium foam half-life.

The above testing is repeated except that 1 ml of oil (West Texas STD) is placed in the cell with the surfactant solution and the temperature is lowered to 41° C. The equilibrium foam half-life is measured using the same techniques. The equilibrium foam half-life is set forth in Table II for both testing with and without oil present in the cell.

EXAMPLE 5

Testing is conducted in an identical manner to Example 4 except that the surface solution is prepared using equal parts of an sodium salt of the disulfonated hexadecyl diphenyl oxide and the ammonium salt of the polyoxyethylated alcohol sulfate. The equilibrium foam half-life is set forth in Table II for both testing with and without oil present in the cell.

COMPARATIVE EXAMPLE D

Testing is conducted in an identical manner to Example 4 except that the one percent surfactant solution is prepared using the ammonium salt of the polyoxyethylated alcohol sulfate only. The equilibrium foam half-life is set forth in Table II for both testing with and without oil present in the cell.

COMPARATIVE EXAMPLE E

Testing is conducted in an identical manner to Example 4 except that the one percent surfactant solution is prepared using the sodium salt of the disulfonated dodecyldiphenyl oxide only. The equilibrium foam half-life is set forth in Table II for both testing with and without oil present in the cell.

COMPARATIVE EXAMPLE F

Testing is conducted in an identical manner to Example 4 except that the one percent surfactant solution is prepared using the sodium salt of the disulfonated hexadecyldiphenyl oxide only. The equilibrium foam half-life is set forth in Table II for both testing with and without oil present in the cell.

TABLE II

| Example No. | Surfactant[1] | Equilibrium Foam Half-Life, seconds | |
|---|---|---|---|
| | | Without Oil | With Oil |
| 4 | $NaC_{12}DPO$/CD128 | 93 | 49 |
| 5 | $NaC_{16}DPO$/CD128 | 172 | 23 |
| D | CD128 | 64 | 4 |
| E | $NaC_{12}DPO$ | 6 | 0 |
| F | $NaC_{16}DPO$ | 9 | 0 |

[1] The surfactant is set forth in abbreviated form with: $NaC_{12}DPO$ being the sodium salt of the disulfonated dodecyl diphenyl oxide; $NaC_{16}DPO$ is the sodium salt of the disulfonated hexadecyl diphenyl oxide; and CD128 is the ammonium salt of the polyoxyethylated alcohol sulfate.

As evidenced by the data set forth in Table II, a combination of the alkylated diphenyl oxide sulfonate with an anionic polyoxyalkylated surfactant imparted much higher equilibrium half-lifes than either the alkylated diphenyl oxide sulfonate or the anionic polyoxyalkylated surfactant. These increased half-life times are particularly noticeable when the foaming test is conducted in the presence of oil, which more closely approximates conditions existing in the oil field.

EXAMPLE 6

In an oil recovery operation, a reservoir which has been depleted to economically undesirable levels using conventional primary recovery and secondary recovery water flooding techniques can be improved using the method of the present invention. Specifically, a conventional five-spot pattern can be employed with four injection wells located in a square pattern and a single producing well located at the center of the four injection wells. A miscible $CO_2$ flood wherein essentially pure $CO_2$ is injected into all four injection wells at pressures sufficient to obtain multiple contact oil miscibility is initiated and conducted until evidence of $CO_2$ channelling to the producing well is realized.

At that time, a volume equal to about 5 percent of the reservoir pore volume of an aqueous solution containing 1 percent by weight of equal parts of an alkali metal salt of an alkylated diphenyl oxide sulfonate and an alkali metal salt of an anionic polyoxyalkylated sulfate is added to the formation through the injection wells. Sufficient water is injected after the surfactant solution to displace the surfactant solution outwardly into the well a distance of about 20 feet. Subsequently, injection of $CO_2$ is again initiated and continued until $CO_2$ channelling is again realized. At that time, injection of the surfactant solution, followed by water, is reinitiated. The injection of the surfactant solution (i.e., the mobility control fluid) and $CO_2$ is continued in this way during the economic lifetime of the reservoir under these flooding conditions.

What is claimed is:

1. An improved method for recovering hydrocarbon from a subterranean formation, the recovery method comprising sequentially injecting, through an injection well, a drive fluid of a gas or a gas/liquid mixture to drive the hydrocarbon from the formation to a producing well and a mobility control fluid of a surfactant-/aqueous fluid mixture into the subterranean formation, the improvement in said method comprising using one or more alkylated diphenyl sulfonates as the surfactant in the mobility control fluid.

2. The improved method of claim 1 wherein the surfactant in the mobility control fluid consists essentially of an alkylated diphenyl sulfonate or mixture of alkylated diphenyl sulfonates, each represented by the general structural formula:

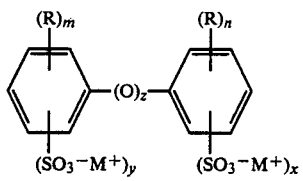

wherein z is 0 or 1; each R is independently an alkyl or substituted alkyl radical; each m and n is independently 0, 1 or 2, provided at least one of m or n is 1; each M is independently hydrogen, an alkali metal, alkaline earth metal, or ammonium and each x and y is individually 0 or 1 with the provision that at least one of x or y is 1.

3. The method of claim 2 wherein z is 1, the R group(s) are independently hydrogen or a linear or branched alkyl group having from 4 to 24 carbon atoms and each M is independently hydrogen or an alkali metal.

4. The method of claim 2 wherein z is 1, the R group(s) are independently hydrogen or a linear or branched alkyl group having from 4 to 24 carbon atoms and $M^+$ represents an ammonium ion radical of the formula $(R')_3HN^+$ wherein each R' is independently hydrogen, a $C_1$-$C_4$ alkyl or a $C_1$-$C_4$ hydroxyalkyl radical.

5. The method of claim 4 wherein the $C_1$-$C_4$ alkyl and hydroxyalkyl radicals include methyl, ethyl, propyl, isopropyl, butyl, hydroxymethyl and hydroxyethyl and the ammonium ion radicals is ammonium ($N^+H_4$), methylammonium ($CH_3N^+H_3$), ethylammonium ($C_2H_5N^+H_3$), dimethylammonium (($CH_3)_2N^+H_2$), methylethylammonium ($CH_3N^+H_2C_2H_5$), trimethylammonium (($CH_3)_3N^+H$), dimethylbutylammonium (($CH_3)_2N^+HC_4H_9$), hydroxyethylammonium ($HOCH_2CH_2N^+H_3$) and methylhydroxyethylammonium ($CH_3N^+H_2CH_2CH_2OH$).

6. An improved gas flooding operation for recovering hydrocarbon from a subterranean formation, the recovery method comprising sequentially injecting, through an injection well, a drive fluid of a gas or a gas/liquid mixture to drive the hydrocarbon from the formation to a producing well and a mobility control fluid of a surfactant/aqueous fluid mixture into the subterranean formation, the improvement in said method comprising using a mobility control fluid containing a two component surfactant mixture with one component of the surfactant mixture being an alkylated diphenyl sulfonate or mixture of alkylated diphenyl sulfonates and the second component of the surfactant mixture being an anionic polyoxyalkylated surfactant or mixture of anionic polyoxyalkylated surfactants.

7. The improved method of claim 6 wherein the two component surfactant mixture in the mobility control fluid consists essentially of an alkylated diphenyl sulfonate or mixture of alkylated diphenyl sulfonates, each represented by the general structural formula:

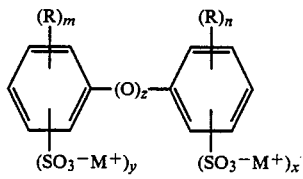

wherein z is 0 or 1; each R is independently an alkyl or substituted alkyl radical; each m and n is independently 0, 1 or 2, provided at least one of m or n is 1; each M is independently hydrogen, an alkali metal, alkaline earth metal, or ammonium and each x and y is individually 0 or 1 with the provision that at least one of x or y is 1 and an anionic polyoxyalkylated sulfate or mixture of polyoxyalkylated sulfates of the general structural formula:

$$R''O[(CH_2)_dO]_eA$$

wherein $R''$ is a hydrocarbon or halogen substituted hydrocarbon radical containing from about 4 to about 24 carbon atoms; d is from about 2 to about 6, e is at least 1, and A is an anionic group.

8. The method of claim 7 wherein z is 1, the R group(s) are independently a linear or branched alkyl group having from 4 to 24 carbon atoms, provided that at least one R group is an alkyl group and each M is hydrogen or an alkali metal and $R''$ is a hydrocarbon or halogen substituted hydrocarbon radical containing from about 6 to about 18 carbon atoms, d is from about 2 to about 6, e is from about 2 to about 20 and A is a sulfate.

9. The method of claim 8 wherein $R''$ is an alkyl group having from 6 to 18 carbon atoms and —A is a sulfate group as represented by the formula:

$$-SO_4^-M^+$$

wherein M is an alkali metal or $NH_4$.

10. The method of claim 9 wherein $R''$ is an alkyl group having from about 6 to about 14 carbon atoms and $M^+$ is sodium or $NH_4$.

11. The method of claim 10 wherein $R''$ is a $C_{6-14}$ alkyl, d is 2, e is from about 2 to about 12 and —A is $-SO_4^-Na^+$.

12. The method of claim 7 wherein z is 1, the R group(s) are independently a linear or branched alkyl group having from 4 to 24 carbon atoms, and $M^+$ represents an ammonium ion radical of the formula $(R')_3HN^+$ wherein each R' is independently hydrogen, a $C_1$-$C_4$ alkyl or a $C_1$-$C_4$ hydroxyalkyl radical and $R''$ is a hydrocarbon or halogen substituted hydrocarbon radical containing from about 6 to about 18 carbon atoms, d is from about 2 to about 6, e is from about 2 to about 20 and A is a sulfate.

13. The method of claim 12 wherein the $C_1$-$C_4$ alkyl and hydroxyalkyl radicals include methyl, ethyl, propyl, isopropyl, butyl, hydroxymethyl and hydroxyethyl and the ammonium ion radicals is ammonium ($N^+H_4$), methylammonium ($CH_3N^+H_3$), ethylammonium ($C_2H_5N^+H_3$), dimethylammonium (($CH_3)_2N^+H_2$), methylethylammonium ($CH_3N^+H_2C_2H_5$), trimethylammonium (($CH_3)_3N^+H$), dimethylbutylammonium (($CH_3)_2N^+HC_4H_9$), hydroxyethylammonium ($HOCH_2CH_2N^+H_3$) and methylhydroxyethylammonium ($CH_3N^+H_2CH_2CH_2OH$).

14. The method of claim 6 wherein the mobility control fluid comprises from about 25 to about 75 weight percent of the alkylated diphenyl sulfonate surfactants or mixture of alkylated diphenyl sulfonate surfactants and from about 75 to about 25 weight percent of the anionic polyoxyalkylated surfactant or mixture of anionic polyoyxalkylated surfactants, based on the total weight of the two component surfactant mixture.

15. The method of claim 6 wherein the gas employed as the drive fluid is air, nitrogen, carbon dioxide, a normally gaseous paraffinic hydrocarbons, crude gases, natural gas, liquefied petroleum gas, a normally gaseous olefinic hydrocarbons or mixture thereof.

16. The method of claim 14 wherein the gas is carbon dioxide or a paraffinic or olefinic hydrocarbon.

* * * * *

UNITED STATES PATENT AND TRADEMARK OFFICE
CERTIFICATE OF CORRECTION

PATENT NO. : 4,739,831

DATED : Apr. 26, 1988

INVENTOR(S) : Lois A. Settlemeyer; Monty J. McCoy

It is certified that error appears in the above-identified patent and that said Letters Patent is hereby corrected as shown below:

Col. 5, line 62, "toprepare" should read --to prepare--.

Col. 6, line 2, delete "0.001" and insert --0.01--.

Col. 9, line 55, delete "surface" and insert --surfactant--.

Col. 13, line 11, delete "surfactants" and insert --surfactant--.

Signed and Sealed this

Fifteenth Day of November, 1988

Attest:

DONALD J. QUIGG

*Attesting Officer*      *Commissioner of Patents and Trademarks*